L. DAVIS.
FRAME FOR MOVING PICTURE SCREENS.
APPLICATION FILED SEPT. 4, 1915.

1,229,044.

Patented June 5, 1917.
2 SHEETS—SHEET 1.

WITNESSES
Emil E. Hallenberg
Paul A. Niersen

INVENTOR
L. Davis
By H. J. Sanders
Atty.

L. DAVIS.
FRAME FOR MOVING PICTURE SCREENS.
APPLICATION FILED SEPT. 4, 1915.
1,229,044.
Patented June 5, 1917.
2 SHEETS—SHEET 2.
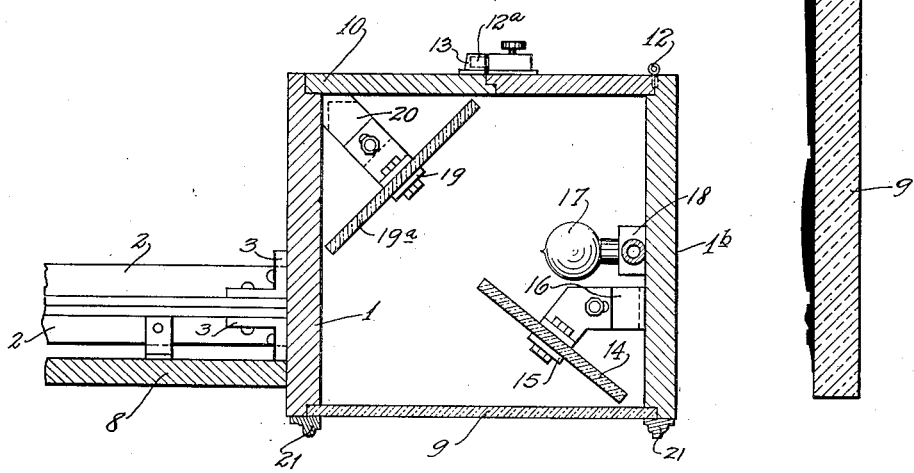
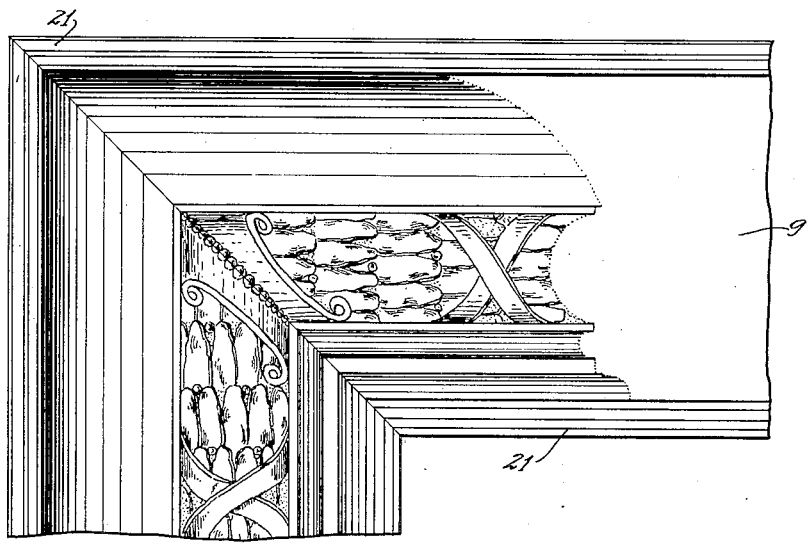
WITNESSES
Emil E. Hallenberg
Paul A. Niesen
INVENTOR
L. Davis.
By H. J. Sanders
Atty

UNITED STATES PATENT OFFICE.

LOUIS DAVIS, OF STREATOR, ILLINOIS.

FRAME FOR MOVING-PICTURE SCREENS.

1,229,044.  Specification of Letters Patent.  Patented June 5, 1917.

Application filed September 4, 1915. Serial No. 48,976.

*To all whom it may concern:*

Be it known that I, LOUIS DAVIS, a citizen of the United States, residing at Streator, in the county of La Salle and State of Illinois, have invented certain new and useful Improvements in Frames for Moving-Picture Screens, of which the following is a specification.

This invention relates to improvements in frames for moving picture screens and one object is to produce a frame that may be illuminated to give the picture a finished effect. The frame, which extends around the moving picture screen, is arranged to be illuminated by indirect lighting and while the frame is brilliant there is apparently very little bright outside illumination and the screen surface is not injured by light in any way, the plane of the front face of the frame being disposed in a plane two or three inches in front of the plane of the face of the moving picture screen.

My frame comprises a framed effect border for the moving picture screen having spaced face and back portions and between the same a plurality of low power electric lights are arranged. The face of the frame is made preferably of plate glass polished on one side and ground on the other and treated to several applications of paint to render it more or less opaque.

Between the face of the frame and the lights an adjustable reflector is arranged which extends entirely around the frame and preferably placed at right angles thereto and spaced away therefrom is another reflector which also extends entirely around the frame and which receives light reflected from the first named reflector and projects this reflected light upon the plate glass face of the frame to give it depth and to afford an effective setting for the picture.

With the foregoing and other objects in view the invention consists in the combination and arrangement of parts to be hereinafter fully described in the following specification, pointed out in the claims and illustrated in the accompanying drawings which form a part of said specification and in which—

Fig. 3 is an enlarged cross section through the frame.

Fig. 4 is an enlarged fragmentary view of the frame showing a particular design worked thereon.

Fig. 5 is a vertical section, enlarged, through the face of the frame showing the manner of applying paint thereto to produce certain light effects.

Like reference characters indicate corresponding parts throughout the several views.

Figure 1:
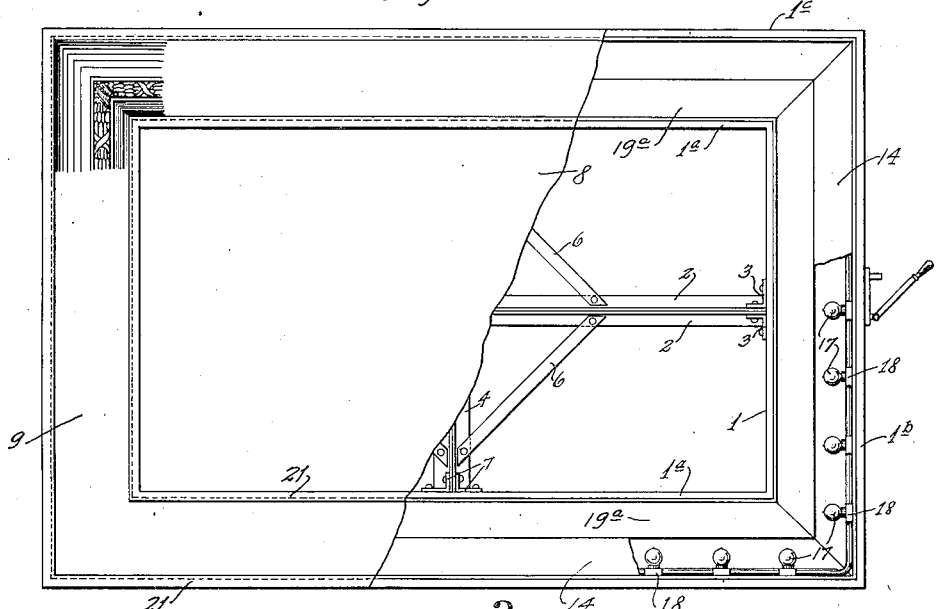
Figure 1 is a front view of my frame shown in connection with a moving picture screen, one corner of the frame having a particular design made thereon and part of the frame and of the screen being broken out to show the adjustable frame supports and the reflector and light arrangement.
Figure 2:
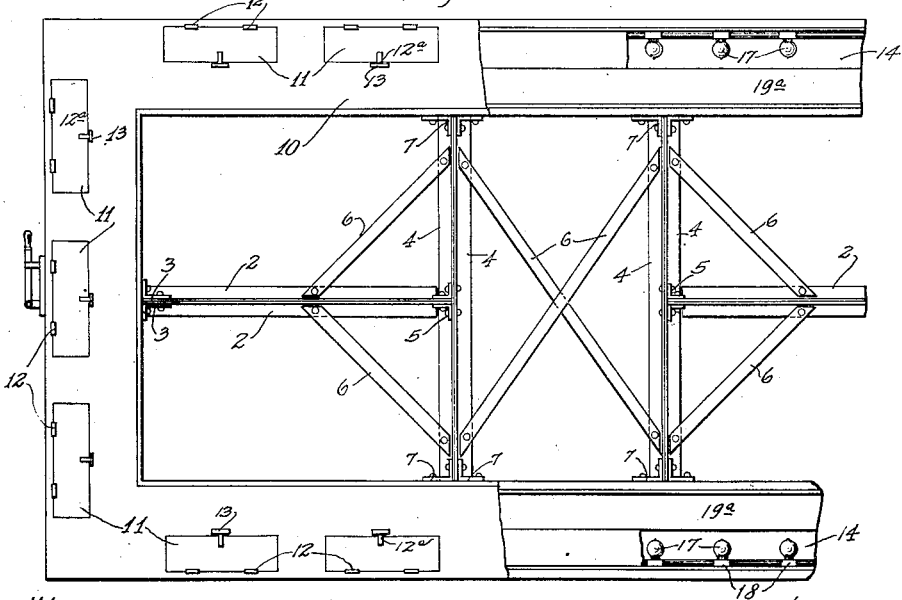
Fig. 2 is a fragmentary rear view.

My frame comprises the wooden supports 1, 1$^a$ to the former of which the horizontally disposed angle irons 2 are connected by brackets 3, said angle irons being also connected to vertically disposed angle irons 4 by suitable brackets 5 and by brace rods 6 and said angle irons 4 being secured to the supports 1$^a$ by suitable brackets 7. The arrangement and disposition of the angle iron supports is such that the frame may be readily lengthened or heightened by eliminating or adding to these supports as occasion may require and then suitably connecting or bracing them.

To the angle irons aforesaid the moving picture screen 8 is secured and the outer sides of supports 1, 1$^a$ are rabbeted to receive one edge of the glass face 9 of the frame and also to receive one edge of the back 10 of the frame, the opposite edges of said face 9 and back 10 being fixed in the rabbeted portions of the marginal wooden supports 1$^b$, 1$^c$; and said back frame portion 10 is provided with doors 11 operable upon hinges 12 and normally retained in closed relation by means of manually operable bolts 12$^a$ and keepers 13.

Within the inclosure formed by the front and back 9, 10 and the sides 1, 1$^b$ or 1$^a$, 1$^c$ of the frame a suitable glass or metal primary reflector 14 is arranged and supported directly in the pivotal heads 15 of longitudinally adjustable or telescoping brackets 16 which are secured to the supports 1$^b$ or 1$^c$. Back of the said primary reflector, with relation to the face 9 of the frame, a plurality of low power electric lamps 17 are carried by boxes 18 secured to the frame, the globes of the lamps being preferably colored a certain shade of red to give the effect most desired.

Spaced away from the primary reflector and preferably disposed in a plane approximately at right angles thereto is a secondary reflector 19ᵃ similar in all respects to the primary reflector and adjustably supported in the pivotal heads 19 of longitudinally adjustable or telescoping brackets 20 carried by the supports 1 or 1ᵃ and the back portion 10 of the frame.

Referring again to the front 9 of the frame, the edges thereof are partially covered, as well as the edges of the supports 1, 1ᵃ, 1ᵇ, 1ᶜ by a molding 21, and said front 9 which is preferably made of glass, polished on one side and ground on the other, mitered and set forward approximately two inches from the plane of the face of the moving picture screen, is treated to several coats of paint which are applied in the following manner: The first coat of paint is stippled over the one side of the glass, then a somewhat darker shade of paint is shaded on, several coats thick until a bevel effect is obtained. After this process the paint is stenciled over and shading is blended out to make the particular design thus formed, stand out. The color of the paint is not of primary importance but the number of coats applied is of importance in order that the glass may be rendered more or less translucent in the required spots as it is in this manner the desired effect of depth to the frame is produced upon the face 9.

In Fig. 4 I illustrate one design that may be worked upon the frame. To bring out the beauty of this design the lamps 17 are turned on which will throw light direct upon one side of the primary reflector from which it will be thrown upon the secondary reflector and there diffused upon the face 9 of the frame and back to primary reflector and then diffused on the face 9 and the continual illumination of this frame in this manner will eliminate any dull moment on the screen and it is in itself an attraction. Used in connection with feature subjects it gives them distinctiveness because of the novel effect and does greatly add to the perspective of a picture. Any sort of screen or curtain may be easily attached. An extension switch may be run from the wiring in the frame to any convenient point and the frame illuminated for any subject desired. While the foregoing is the preferred embodiment of my invention I wish it understood that I do not limit myself to the specific structure described, as many departures therefrom may be effected and still fall within the scope of the appended claims.

What is claimed is:—

1. A frame for moving picture screens comprising spaced supports, a translucent face carried by said supports, said translucent face including a stippled coating of coloring material applied thereto, said stippled coating itself having applied thereover coatings of darker coloring material providing for a beveled effect, the latter coatings being stenciled over to provide a particular design upon said frame, a back carried by said supports, a primary reflector arranged between said back and face, a plurality of lamps disposed back of said primary reflector with relation to said face and a secondary reflector spaced from said primary reflector.

2. A frame for moving picture screens comprising spaced supports, a translucent face carried by said supports, said translucent face having applied thereto means to provide a particular design thereon, said design producing means being treated to simulate depth under the diffusing action of the reflected light, a back carried by said supports, a reflector arranged between said back and face, a plurality of lamps disposed back of said reflector with relation to said face and means arranged to receive the light from said reflector and diffuse it upon said translucent face.

3. A frame for moving picture screens comprising spaced supports, a translucent face carried by said supports, means for rendering said face translucent, including coatings of coloring material applied thereto, said coatings of coloring material being treated to constitute a design, a back carried by said supports, a reflector arranged between said back and face, a plurality of lamps disposed back of said reflector with relation to said face and means arranged to receive the light from said reflector and diffuse it upon said face.

4. A frame for moving picture screens comprising spaced supports, a translucent face carried by said supports, a back carried by said supports, an adjustable primary reflector arranged between said back and face, a plurality of lamps disposed back of said primary reflector with relation to said face and a secondary adjustable reflector spaced away from said primary reflector, said translucent face comprising a stippled coating of coloring material, applied thereto, said stippled coating having applied thereover coatings of darker coloring material, said reflectors and lamps being adapted to deliver diffused rays of light upon said face.

5. A frame for moving picture screens comprising spaced supports, a translucent face carried by said supports, said translucent face including a stippled coating of coloring material applied thereto, said stippled coating having applied thereover coatings of darker coloring material, said reflectors and lamps being adapted to deliver diffused rays of light upon said face, a back carried by said supports, an adjustable primary reflector arranged between said back and face and preferably disposed at an angle to the latter member and a secondary reflector spaced from said primary reflector and preferably disposed in a plane at right angles thereto to receive light therefrom and to diffuse the same upon said face.

In testimony that I claim the foregoing as my own I have hereto affixed my signature in the presence of two subscribing witnesses.

LOUIS DAVIS.

Witnesses:
 GEO. H. DAUBNER,
 CHARLES E. STEPHENSON.